United States Patent [19]

Mendoza-Orozco

[11] 3,993,178

[45] Nov. 23, 1976

[54] FREE-WHEELING MECHANISM

[76] Inventor: Hector Mendoza-Orozco, Adolfo Prieto 1709, Mexico City 12, Mexico

[22] Filed: Feb. 28, 1975

[21] Appl. No.: 554,269

Related U.S. Application Data

[63] Continuation-in-part of Ser. No. 409,106, Oct. 24, 1973, abandoned.

[30] Foreign Application Priority Data

Sept. 17, 1973  Mexico .............................. 146212

[52] U.S. Cl...................................... 192/64; 192/46
[51] Int. Cl.² ......................................... F16D 23/00
[58] Field of Search ............................... 192/45, 64

[56] References Cited
UNITED STATES PATENTS

| | | | |
|---|---|---|---|
| 593,688 | 11/1897 | Redding .............................. | 192/64 |
| 2,211,548 | 8/1940 | Schwinn .............................. | 192/64 |
| 2,489,934 | 11/1949 | Schwinn .............................. | 192/64 |

*Primary Examiner*—Samuel Scott
*Assistant Examiner*—Lance W. Chandler
*Attorney, Agent, or Firm*—Ladas, Parry, Von Gehr, Goldsmith & Deschamps

[57]  ABSTRACT

A free-wheeling mechanism, comprised of a shaft with threaded ends; two fixed cones joined thereto by means of said threadings; a movable cone, one of the ends of which includes a hollow portion into which one of the fixed cones fits on a ball bearing and the other end being toothed, a set of roller bearings being held in place at that point. These roller bearings are adjustable by means of an adjusting device, which in turn, is also joined to the shaft; also joined to this shaft are a set of housings, which together with the movable cone, as well as by the oppositely placed cone, make up the bearing races. Included, as well, is a hollow cylindrical body with two supporting end plates which serve to hold the spokes and which make up the hub of the freely rolling wheel. Inside of this hub, all of the aforementioned components are housed, with exception of that part of the movable cone that includes the hollow portion as well as the fixed cone fitted into said hollow portion.

1 Claim, 10 Drawing Figures

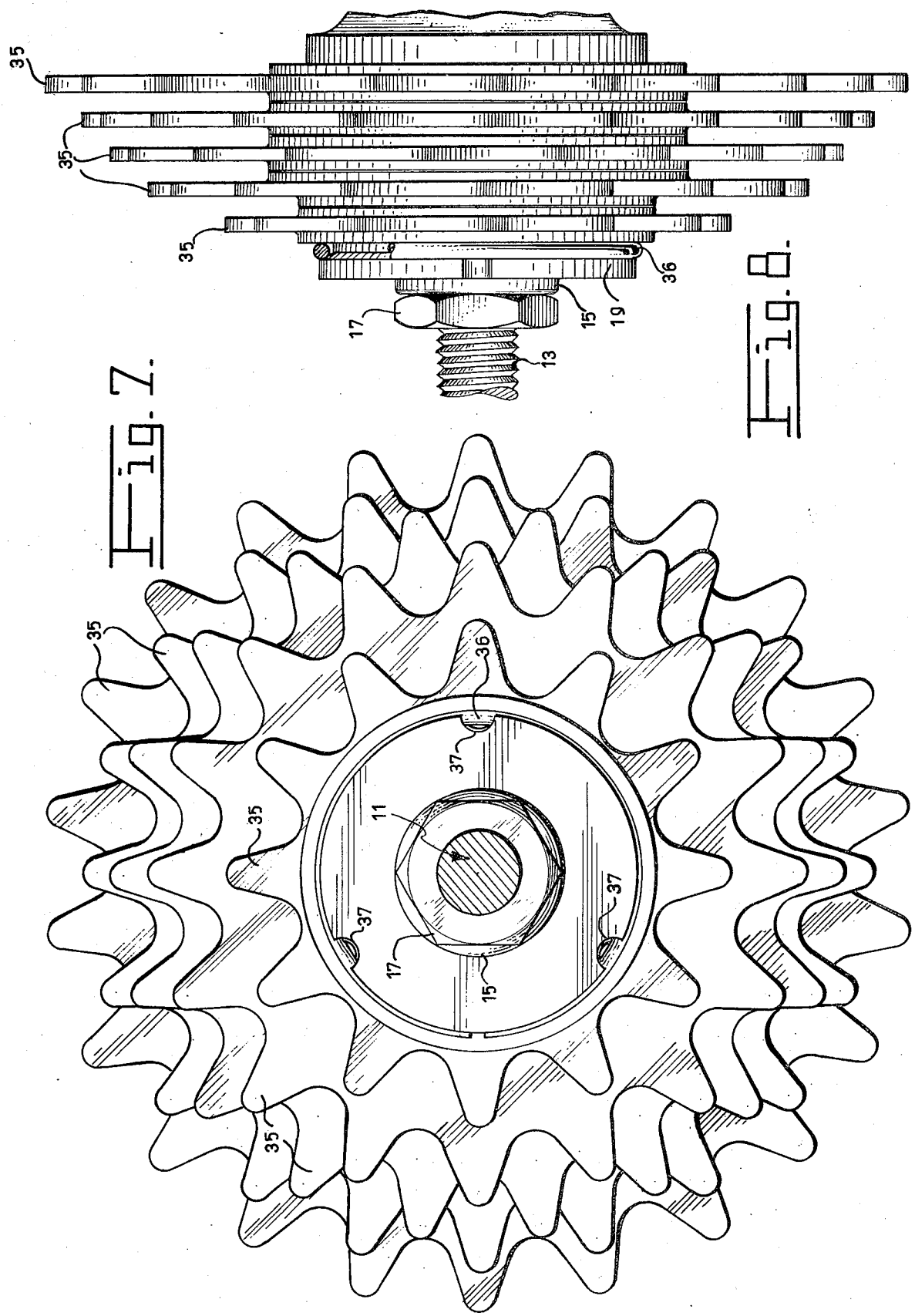

FREE-WHEELING MECHANISM

CROSS REFERENCE

This is a Continuation-In-Part application of my co-pending application, Ser. No. 409,106 filed Oct. 24, 1973. now abandoned.

BACKGROUND OF THE INVENTION

One of the main problems encountered since the motor vehicle was invented, was that of developing a mechanism which adequately allows the elimination of motion along the entire length of the power train, thereby permitting it to remain stationary although the wheels continue to turn. For example, as relates specifically to bicycles, upon ceasing to exert pressure upon the pedals, these remain stationary, whereas the wheels continue to turn. It was thus that the mechanism known as a "freely-turning wheel" became known.

These "free-wheel" mechanisms are generally very complicated and are henceforth costly, both as concerns their concept, as well as their manufacture. On the other hand, they do not in fact supply a truly effective freely-turning wheel, due to the fact that they include a series of components which create a constant source of friction, therefore generating a restraining effect. For example, in the case of a free-wheeling mechanism as applied to bicycles in particular, this generally includes a built-in brake, thus incorporating what can be considered as an integrally comprised restraining effect, in fact, this mechanism contains what amounts to three clearly distinguishable restraining effects upon the bearing on which the sprocket turns and to which the chain is coupled: that is, the aforementioned brake; the brake ratchets upon which the brake mechanism itself constantly slides on; and the tension exerted by the chain itself. There is as well, another case of what is known as a free-wheeling mechanism as used on bicycles, which is the back pedal-pressure brake, working together with a free pinion and which presents a built-in restraining mechanism within itself.

In either of the free-wheeling mechanisms mentioned above, no possibility exists of incorporating an optional reverse, inasmuch as braking will occur precisely upon applying the desired reverse motion. Consequently, this would result in an added inconvenience to the aforementioned known mechanisms.

Another inconvenience of the free-wheeling mechanisms as applied on bicycles, is the fact that has been pointed out which results in their complexity of manufacture. The result, therefore, is that should a simple and rapid adaptation be desired in order to convert from a simple single-speed drive into a multiple-speed drive, the conversion is not feasible inasmuch as it is uneconomical.

OBJECTS OF THE INVENTION

One object of the invention is therefore, to provide free-wheeling mechanism, of relatively simple manufacture and in addition, which is economical.

Another object of the invention is to provide a free-wheeling mechanism, which will provide an effective freely-rolling wheel upon ceasing to pedal, inasmuch as any restraining pressure is absent therefrom.

An additional object of the invention is to provide a free-wheeling mechanism which may or may not be fitted with a reverse.

Still another object of the invention is to provide a free-wheeling mechanism, which although simple to manufacture, also permits the easy adaptation of a multiple free-wheel mechanism, thus providing various speeds.

These and other objects to be obtained in the practice of this invention will be better understood and appreciated upon reading the following description, which makes reference to the drawings of the preferred embodiment thereof.

SUMMARY OF THE INVENTION

This invention relates to a free-wheeling mechanism comprising a shaft having threaded ends; two fixed cones coupled to the threaded ends of said shaft; a movable cone coupled to one end of said shaft, which movable cone includes, at one of its ends, a hollow center portion registering with one of said fixed cones and forming with it a raceway, and which movable cone has its other end opposite to that including the hollow portion as a toothed head; a set of rollers supported on said toothed head; separating means including slots, coupled to said shaft for maintaining separated said rollers and that they project or not through said slots; a cup coupled to the end of said shaft opposite to that end including the movable cone, which cup registers with the other fixed cone forming with it a raceway; bearings runnning in said raceways; a hub coupled to said shaft housing each and every of the preceding parts, which hub comprises a hollow cylindrical body as a central part thereof and two plates ending said hollow cylindrical body, which plates support spokes; and means for supporting said separating device and preventing it from being locked when the set of rollers are allowed to escape contact with the hub.

DESCRIPTION OF THE DRAWINGS

FIG. 7, is a frontal vertical elevational view, illustrating said free-wheeling mechanism, with a multiple-type mechanism, or one that includes various speed ranges.

FIG. 8, is a detailed lateral vertical elevational view, showing the part at the end of the movable cone in a case in which the mechanism is multiple, that is comprising various speed ranges.

DETAILED DESCRIPTION OF THE INVENTION

Figure 1:
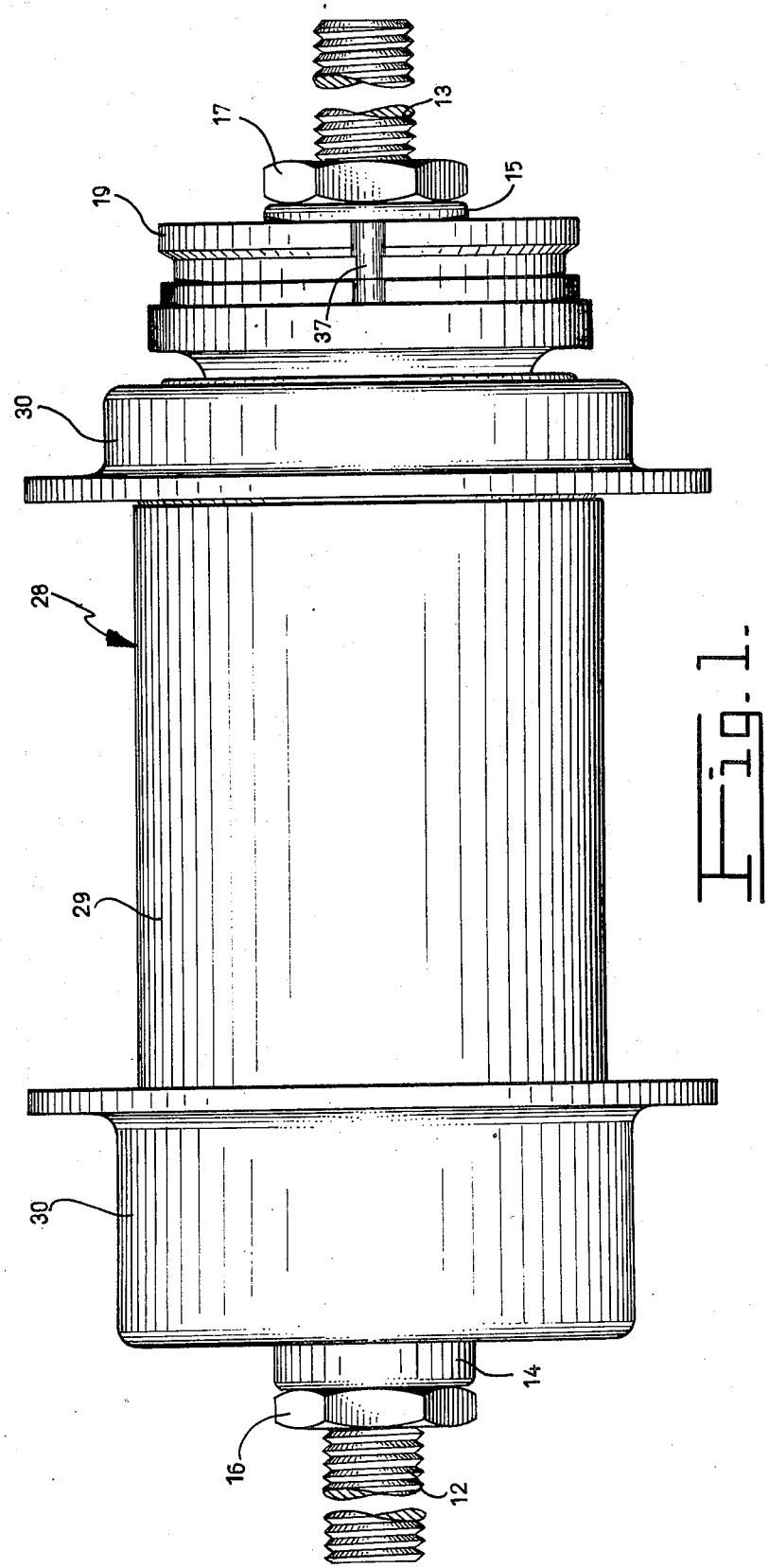
FIG. 1, is a vertical elevational view of the free-wheeling mechanism of this invention.
Figure 2:
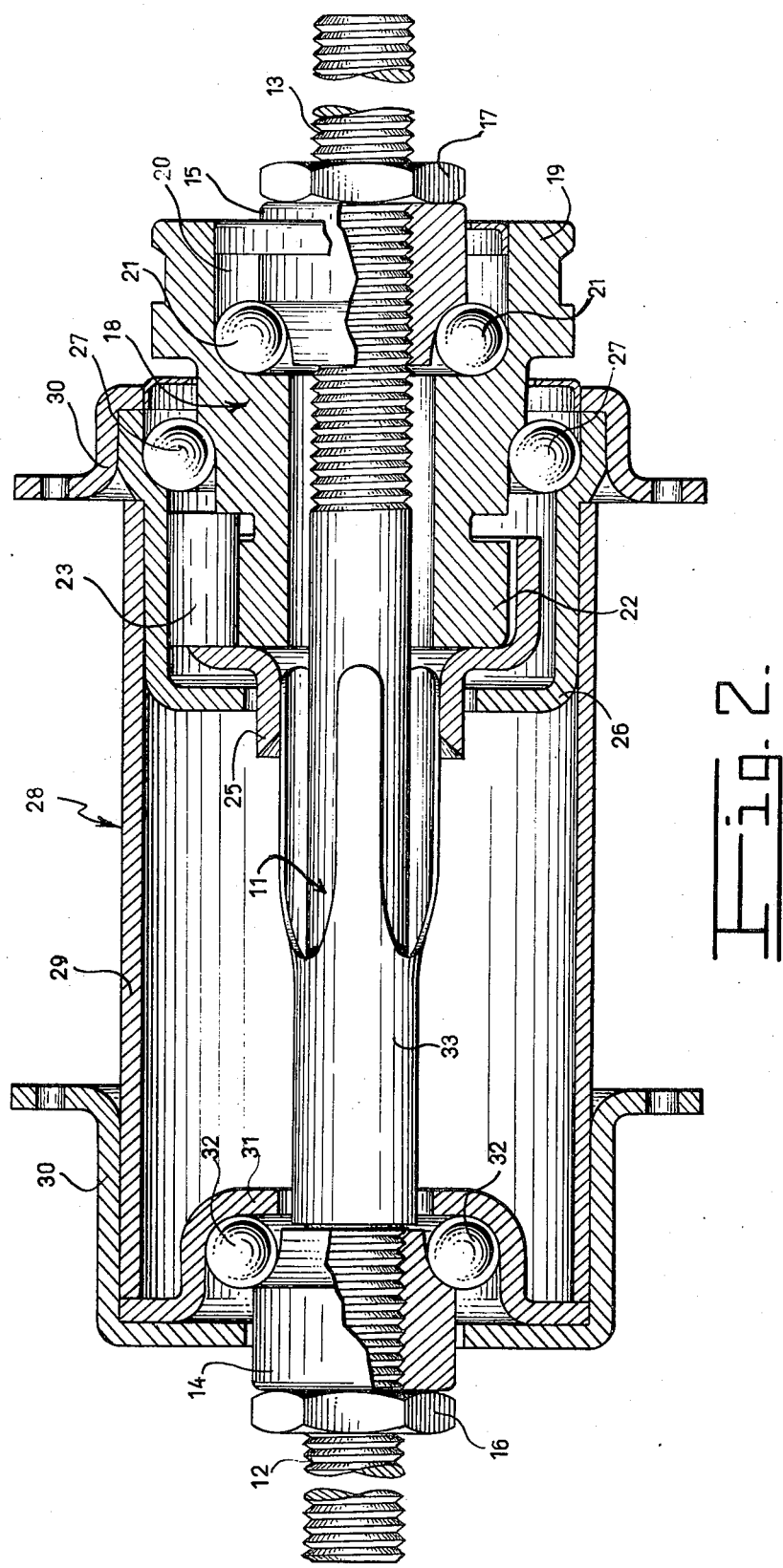
FIG. 2, is a longitudinal cross-sectional view illustrating the free-wheeling mechanism of the invention.
Figure 3:
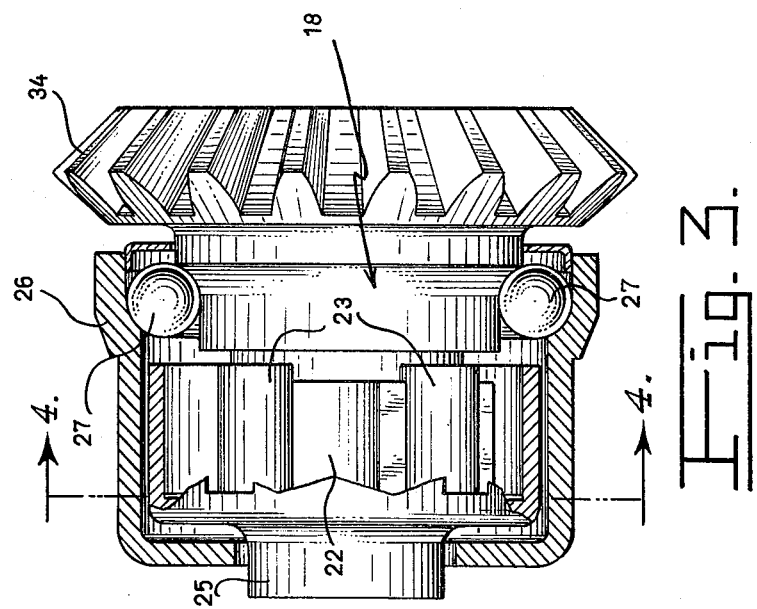
FIG. 3, is a detailed vertical elevational view of the movable cone of the improved free-wheeling mechanism of this invention in a case in which the transmission of motion is by means of a shaft and also shown in a conventional longitudinal cross-section the corresponding housing and the separating device.

The invention refers to mechanisms involving turning wheels and more specifically, to free-wheeling mechanism, which consists, as can be seen in FIG. 2, of a shaft 11, with its corresponding ends 12 and 13, which are threaded, on which are joined by means of this threading, a set of fixed cones 14 and 15, which are joined to the shaft 11 by means of a set of lock nuts 16 and 17.

On one of the threaded ends 13, a movable cone 18 is coupled freely, this cone includes at one of its ends 19, a hollow portion 20, in which one of the fixed cones 15 is afixed; in this manner, between the hollow portion 20 and the fixed cone 15, a bearing race is thus formed 21, by means of which the movable cone 18, is allowed to circle around the shaft 11. On the other hand, the above cone end 19, of the movable cone 18, is designed to support the coupling device of the free-wheeling mechanism referred to in this invention, as used when motion is applied thereto.

Figure 4:
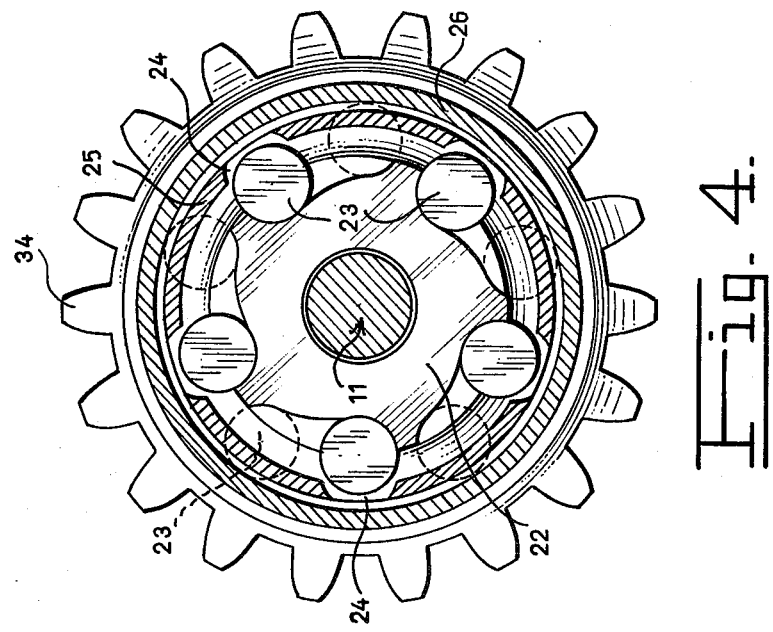
FIG. 4, is a cross-sectional view, through line 4—4 of FIG. 3.
Figure 5:
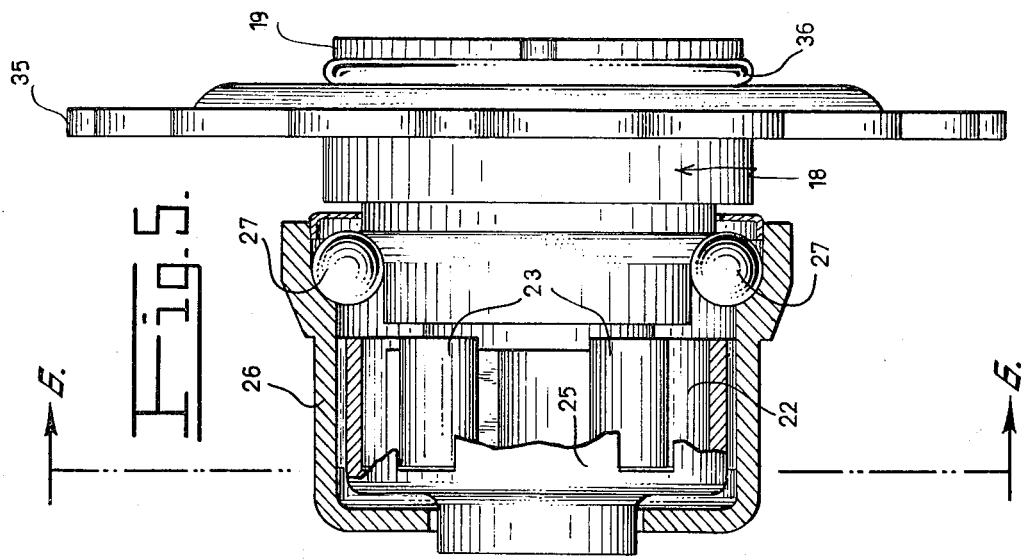
FIG. 5, is a view similar to that of FIG. 3, which illustrates a case in which the transmission of motion is by means of a chain drive.
Figure 6:
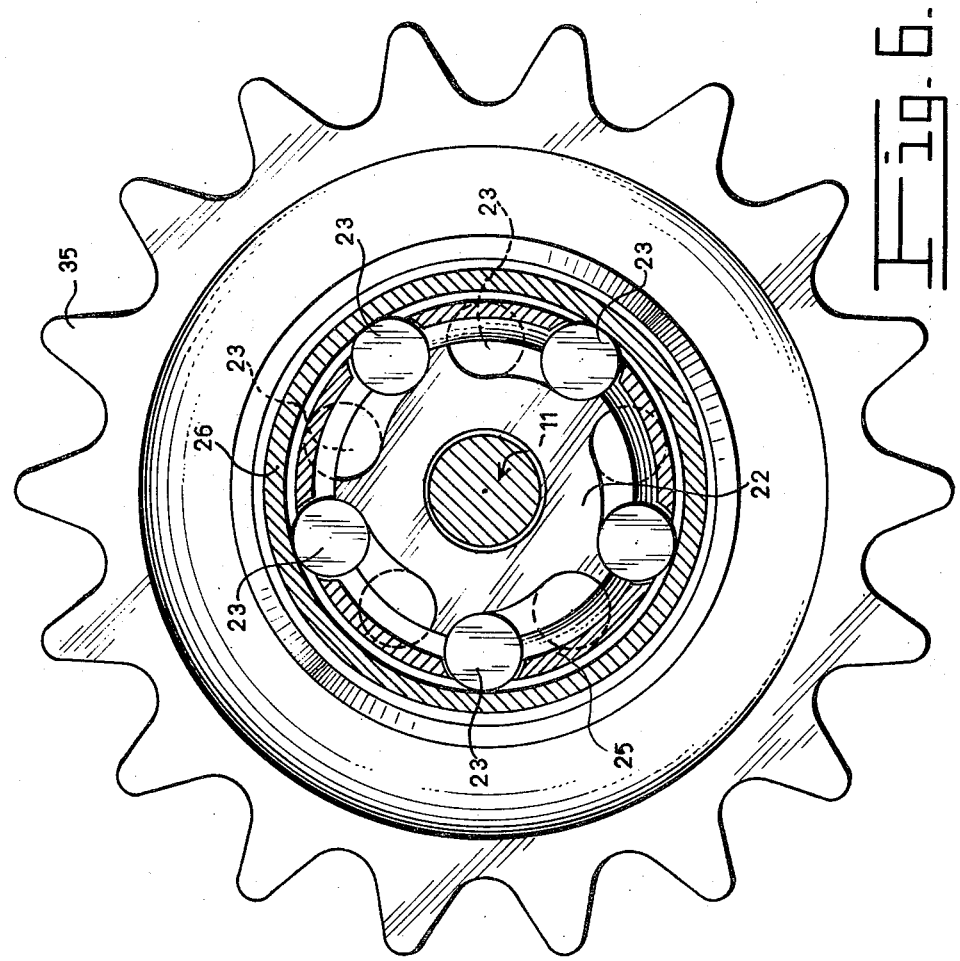
FIG. 6, is a cross-sectional view, through line 6—6, of FIG. 5.

The extreme portion, or end of the movable cone 18, opposite the cone end 19, is made up of a toothed head 22, whose cross-section is constituted by inclined planes (as can be noted in FIGS. 4 and 6). In this toothed head 22, a set of bearings 23 is held in such a manner that these bearings are forced by the inclined planes, to either project through or remain in a set of slots 24 corresponding to a separating device 25 and consequently, either force the wheel to turn, or else allow for the free movement of the aforementioned toothed head 22.

The above is feasible, because the movable cone 18, with exception of its end 19, is located within the housing 26, and, furthermore, this housing 26 together with the rollers 23 and the separating device 25, forms, together with the central part of the movable cone 18, a raceway within which runs a set of ball bearings 27, by means of which the above housing 26, can turn. Upon transmission of motion to the movable cone 18, it will turn upon the roller bearings 21, around the shaft 11, therefore, by means of the inclined planes of the toothed headpiece 22, the bearings 23 are forced to project through the slots 24 of the separating device 25 thus imparting motion, in the same manner, to the housing 26, upon engagement of these bearings 23 with the housing 26.

In a similar manner, if the housing 26 turns in an opposite direction to that described above, the bearings 23, do not project through the slots 24 pertaining to the separating device 25, thus the movable cone 18 remains motionless. Nevertheless, the housing 26, continues to turn inasmuch as it is supported by the bearings 27.

As a result of the above and as this housing 26 is integrally coupled with a wheel hub 28 said hub 28 is made up of a hollow cylindrical body 29, which forms the central part thereof and of two end pieces 30 to which the required spokes may be attached, thus the wheel in question is, therefore able to turn.

With the purpose of complementing the mechanism referred to in the invention in question, the cone 14, is fixed within another housing 31, which in conjunction therewith, forms a raceway for the required bearings 32.

The free wheeling mechanism of the present invention includes a spring 33 supporting the separating device 25, which spring 33 is attached by pressure to the shaft 11, so that said spring 33 be substantially secured to the shaft 11.

Furthermore, spring 33 is supporting the separating device 25 permitting it to frictionally rotate thereabout, and thus permitting the wheel which includes the mechanism of the present invention to adequately turn, either when the rollers 23 are engaging the interior of housing 26 or when said rollers 23 are freed from the engagement with housing 26.

Consequently, this sort of mechanism allows the wheel including it, to turn in a forward direction because of rotation of head 22 when pedalling and to turn in a forward or backward direction when head 22 is stopped i.e. when not pedalling.

On the other hand, in the case that the mechanism does not include said spring 33 it will not have a reverse, because the separating device 25 will remain free and therefore will always force the rollers 23 to project through slots 24 so as to engage the interior of housing 26 and to deliver rotation to the hub 28.

Finally, the coupling devices which are supported by the end 19 of the movable cone 18, may be either a pinion 34, integrally related to the end in question 19, or else one or various sprockets 35, coupled in a removable manner to this end 19, as well, to be used in such cases wherein power transmission is, in the first case, by means of a shaft, or in the second case, where power is transmitted by means of a chain drive, respectively.

Wherein chain drives are used, as has been mentioned, several sprockets 35, may be used, these having a varying number of teeth (as can be noted in FIG. 7 & 8), in order to provide the mechanism with a multiple free turning wheel, that is providing it with varying speed ranges. This type of multiple free turning wheel is very easily adapted, insofar as it is only necessary to change the included sprocket 35, for one with the number of teeth desired, simply by separating the circular retainer 36 and adequately inserting, by means of some quide grooves 37, which are included in the outside end 19 of the movable cone 18, the aforementioned required sprocket.

On the other hand, as has been mentioned herein, the free-wheeling mechanism of the invention is easily adaptable, inasmuch as the fact that the movable cone 18 in which the sprockets 35 are supported, is cheaply produced and consequently, if it should be desired to transfer from a simple mechanism involving a single sprocket 35, to a multiple mechanism, for example, five sprockets, which would logically require a much wider area at the end 19 of the movable cone 18 than for a simple mechanism, it would then be merely necessary to change this movable cone 18 for the one required, something which does not imply any, or almost no additional cost.

Figure 9:
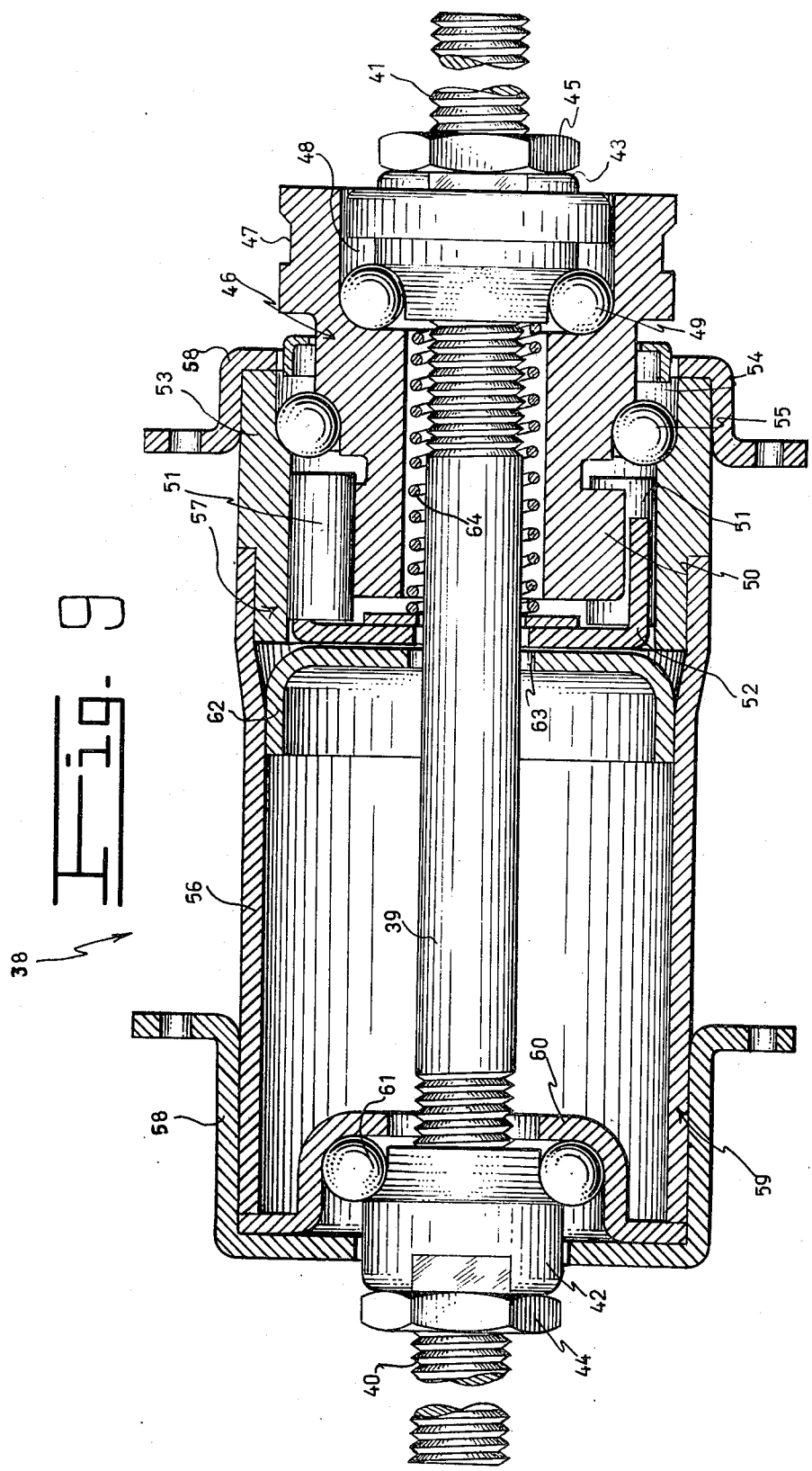
FIG. 9, is a longitudinal cross-sectional view illustrating another embodiment of the free-wheeling mechanism of the invention.

Another of the embodiments which the invention provides consists of a free wheeling mechanism 38 as illustrated in FIG. 9, which comprises like the previous embodiment a shaft 39 with its two end portions 40 and 41 threaded, upon which are attached fixed cones 42 and 43 by means of lock nuts 44 and 45.

Upon one of the threaded end portions 41 a movable cone 46 is freely attached which has one of its end portions 47 with a centered counterbore 48 in which fixed cone 43 is housed, forming between itself and the centered counterbore 48 a raceway for ball bearings 49 by means of which said movable cone 46 turns about the axle 39. The end portion 47 of the movable cone 46 is suited for mounting coupling means for connecting the free wheeling mechanism 38 with the mechanisms for transmitting power to cause it to turn. These coupling means may also be, as defined in the previous embodiment, a pinion which is integral with said end portion 47, or one or several sprockets removably attached to said end portion 47, for shaft or for chain transmission respectively.

The end portion of the movable cone 46 opposed to end portion 47 is a toothed head 50 on which rollers 51 are supported, these being specifically what transmit or do not transmit power to the wheel. Accordingly, just as in the previous embodiment, the toothed head 50 possesses a transverse section composed of inclined planes (see FIGS. 4 and 6) upon which said rollers 51 slide in such a fashion that they either do or do not project through slots in a separating device 52 and accordingly, as above mentioned, either compel the wheel to turn or permit its free turning.

To accomplish the foregoing and unlike the previous embodiment, movable cone 46 in combination with rollers 51 and the separating device 52 is lodged within a tubular portion 53 except for its end portion 47.

The tubular portion 53 includes in an end portion, which coincides with the middle portion of the movable cone 46, a counterbore which provides a raceway 54 for ball bearings 55, whereby the tubular portion 53 can turn. Accordingly when revolving movement is transmitted to the movable cone 46 it turns upon ball bearings 49 around the axle 39, thus compelling rollers 51 placed upon the inclined planes of the toothed head 50 to project through the slots of the separating device 52 and thus to engage the tubular portion 53 and cause it to turn.

Now then, if tubular portion 53 rotates in the opposite direction, rollers 51 do not project through the slots of the separating device 52, whereby the movable cone 46 remains stationary, but said tubular portion 53 continues to rotate because it is supported upon the ball bearings 55.

Tubular portion 53 with its end opposite to the end including the raceway 54, engages fixedly with another tubular portion 56 forming a body 57 which in combination with spoke-supporting plates 58 connected to the ends of said body 57 make up a hub 59.

The mechanism of the present invention is completed with a cup 60 which is located in that end of body 57 registering with fixed cone 42, and which is held in place by the corresponding spoke-supporting plate 50. Said cup 60 constitutes along with fixed cone 42 a raceway for the travel of ball bearings 61. Moreover, cup 60 includes a central orifice so threaded portion 40, of shaft 39 passes through, for fixed cone 42 be properly coupled thereon.

To support the separating device 52 and keep it continuously in a suitable position, the present embodiment unlike the previous one includes an annular retainer 62 which is connected onto the shaft 39 by means of a central orifice 63 having a diameter slightly greater than the diameter of the shaft 39 so as to allow it to turn. The annular retainer 62 is held firm by pressure exerted upon it by the tubular portion 56 of hub 59. The annular retainer 62 supports the separating device 52 in such a manner that it remains always lodged within the tubular portion 53 so that rollers 51 may make contact with it.

Furthermore, a helical spring 64 is included around the shaft 39 in that portion thereof where movable cone 46 is connected. This helical spring 64 has one of its ends supported against the fixed cone 43 and the other end bears against the separating device 52 so that it compels the said separating device 52 to stay in contact with the retainer ring 62 and at the same time permits it to have a rotatory movement in order thus to deliver torque to the wheel, as well as when rollers 51 are not in contact with the hub 59 and the latter is turning, to keep separating device 52 from locking.

In this embodiment there are the same advantages as in the preceding embodiment, except that in this case there is friction in the hub 59 when it is turning without pedalling v.gr. by inertia.

Figure 10:
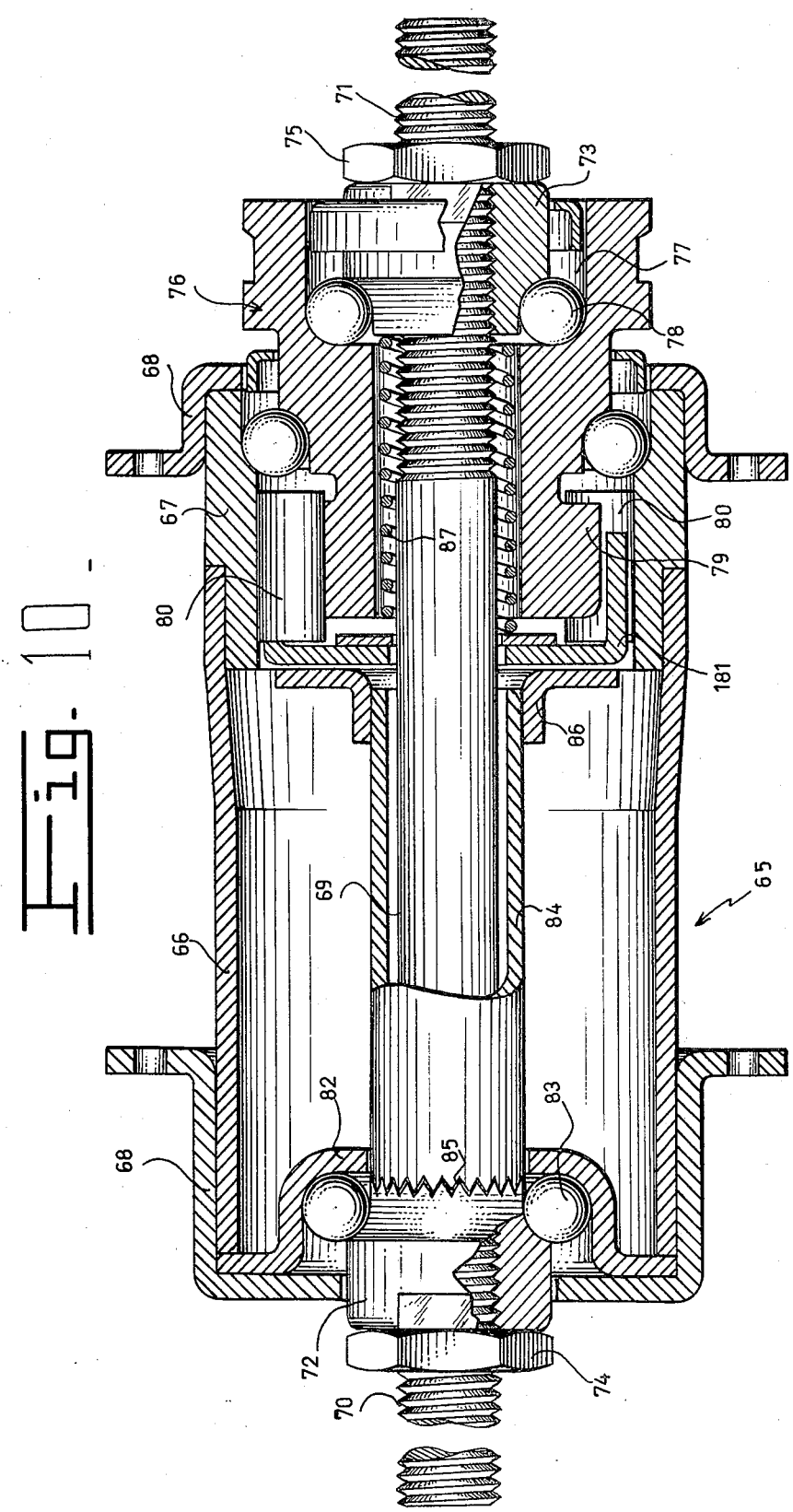
FIG. 10, is a longitudinal cross-sectional view illustrating an additional embodiment of the free-wheeling mechanism of the invention.

The present invention also affords another embodiment (see FIG. 10) of a free wheeling mechanism similar to the two previously described and especially to the free wheeling mechanism 38, which additional embodiment is composed of a hub 65 which is also formed by two tubular portions 66 and 67 joined together at one end, and spoke supporting plates 68 which are attached to the ends of tubular portions 66 and 67 opposite to the interconnection of the latter.

Similarly, the present embodiment comprises an axle 69 with its two end portions 70 and 71 threaded, upon which are threadedly mounted fixed cones 72 and 73 with their corresponding lock-nuts 74 and 75.

Likewise on the threaded portion 71 movable cone 76 is freely connected, forming in combination with fixed cone 73 at one of its ends a raceway 77 for ball bearings 78. This movable cone 76 has an end portion including the raceway 77 adapted for connecting the free wheeling mechanism to the power transmitting mechanisms by suitable engaging means. The end opposite to that having the raceway 77 of the movable cone 76 is shaped like a toothed head 79 composed of inclined planes (see FIGS. 4 and 6), upon which slide rollers 80 which either deliver or do not deliver rotation to the wheel depending on whether or not they go into contact with the tubular portion 67 of the hub 65. These rollers 80 are supported by means of a separating element 81 which has slots by which the said rollers 80, as already noted, either do or do not make contact with the tubular portion 67.

Again as with the free wheeling mechanism 38 the mechanism of the present embodiment is completed with a cup 82 fixed by one end of the hub 65 and of the corresponding spoke supporting plate 68. This cup 82 in combination with fixed cone 72 forms a raceway for ball bearings 83. Also, cup 82 includes a central orifice so threaded portion 70 passes through in order that fixed cone 72 be properly coupled thereon.

Now then, unlike the two embodiments above described, in this embodiment the separating element 81 is supported and is held in a suitable position by the following elements:

A sleeve 84 placed around a portion of the axle 69 in such a manner that one of its ends is supported by means of teeth 85 in fixed cone 72 and the other of its ends coincides substantially with the interengagement between tubular portions 66 and 67, in order to give appropriate support by means of a backing plate 86 to the separating element 81.

And a helical spring 87 surrounding shaft 69 in that portion of the latter where the movable cone 76 is engaged. This helical spring 87 has one of its ends bearing against fixed cone 73 and the other against the separating element 81, thus compelling it to remain in coincidence with the backing plate 86 and at the same time allowing the separating element 81 a turning movement so that it may thus transmit torque to the wheel and at the same time keep it from seizing when rollers 80 are not in contact with hub 65 and the latter is turning, this effect also being due to teeth 85 of sleeve 84.

Finally, in this embodiment the friction obtained is in relation to shaft 69, that is, it is obtained when pedalling, similarly to what happens in the first embodiment.

Although the invention has been shown and described particularly in relation to an specific embodiment of same, those skilled in the art, will understand that the aforementioned and other changes in form and detail can be made without departing from the spirit and scope of same.

I claim:

1. A free wheeling mechanism comprising a shaft having threaded ends; two fixed cones coupled to the threaded ends of said shaft; a movable cone coupled to one end of said shaft, which movable cone includes, at one of its ends, a hollow center portion registering with one of said fixed cones and forming with it a raceway, and which movable cone has its other end opposite to that including the hollow portion as a toothed head; a set of rollers supported on said toothed head; separating means including slots, coupled to said shaft for maintaining separated said rollers such that free wheeling occurs when said rollers do not project through said slots; a cup coupled to the end of said shaft opposite to that end including the movable cone, with cup registers with the other fixed cone forming with it a raceway; bearings running in said raceways; a hub coupled to said shaft housing each and every of the preceding parts, which hub comprises a hollow cylindrical body as a central part thereof and two plates ending said hollow cylindrical body, which plates support spokes; and means for supporting said separating means and preventing it from being locked when the set of rollers are allowed to escape contact with the hub wherein said hollow cylindrical body of the hub comprises two interengaged tubular portions, and said means for supporting the separating means and preventing it from being locked comprises a sleeve having teeth at one of its ends and a backing plate at the other, which sleeve is placed around a portion of said shaft in such a manner that said teeth are supported in one of said fixed cones and said backing plate registers with said separating means; and a helical spring included around the shaft, which helical spring has one of its ends supported against the other of the fixed cones and the other of its ends bears against the separating means.

* * * * *